UNITED STATES PATENT OFFICE.

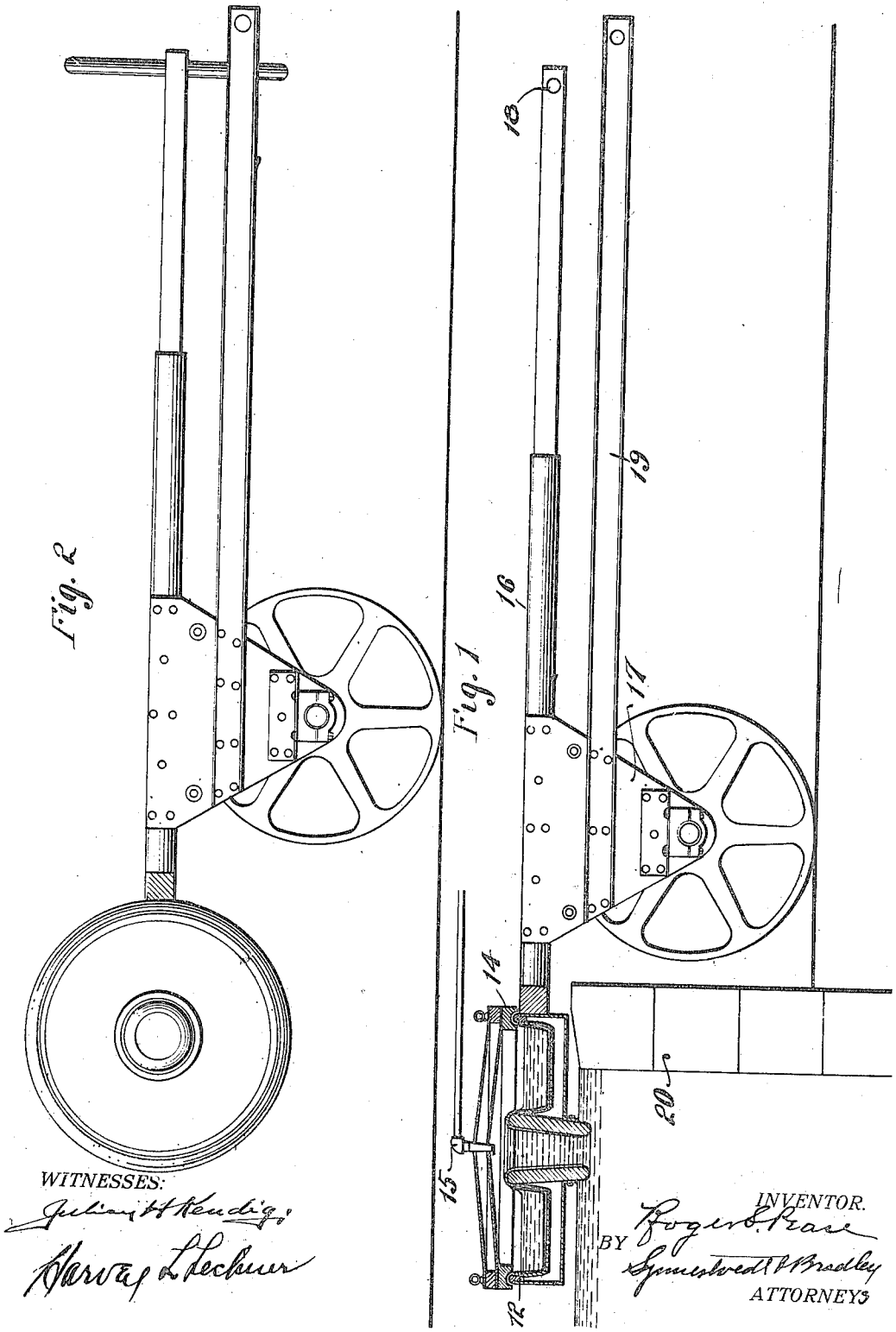

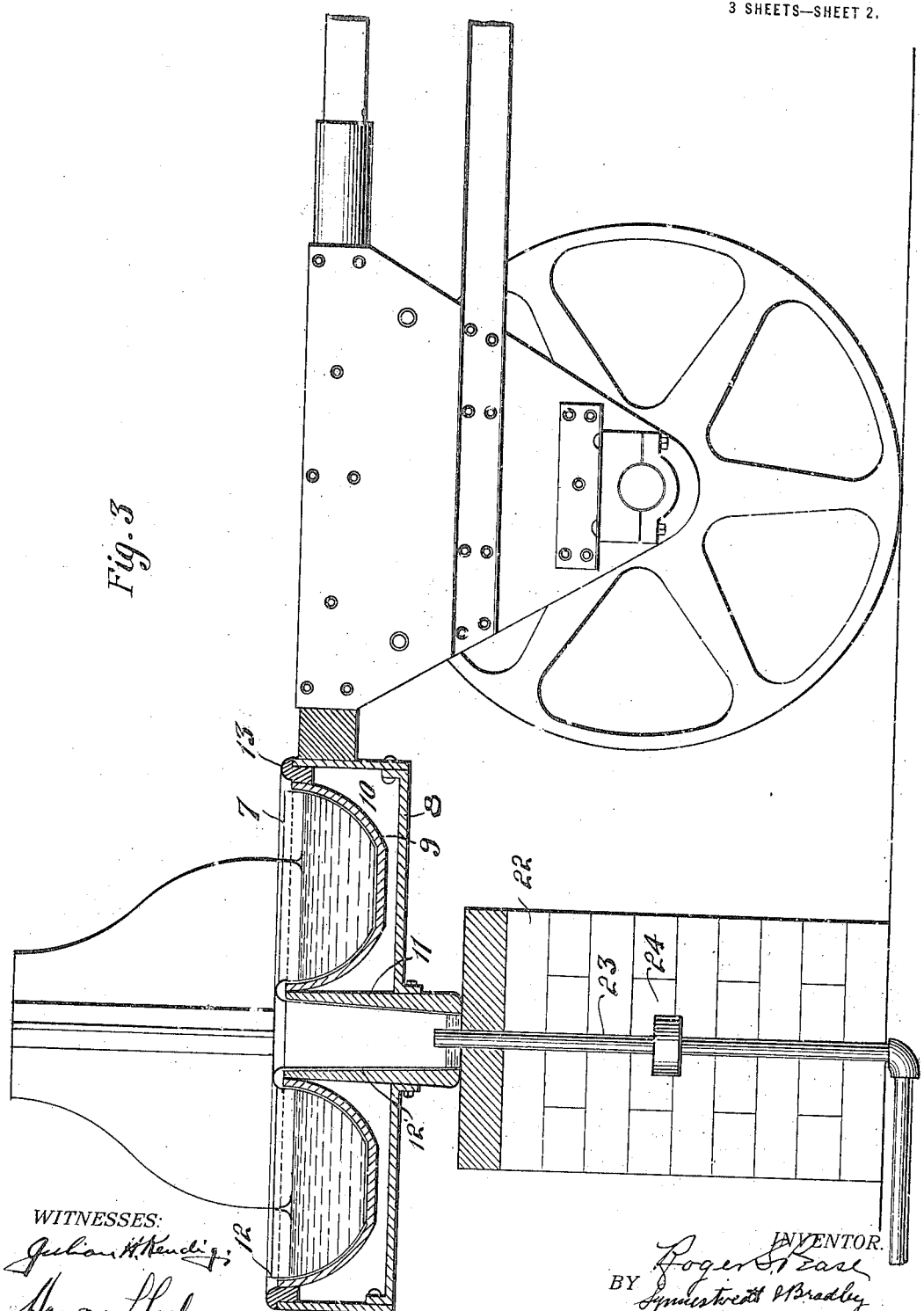

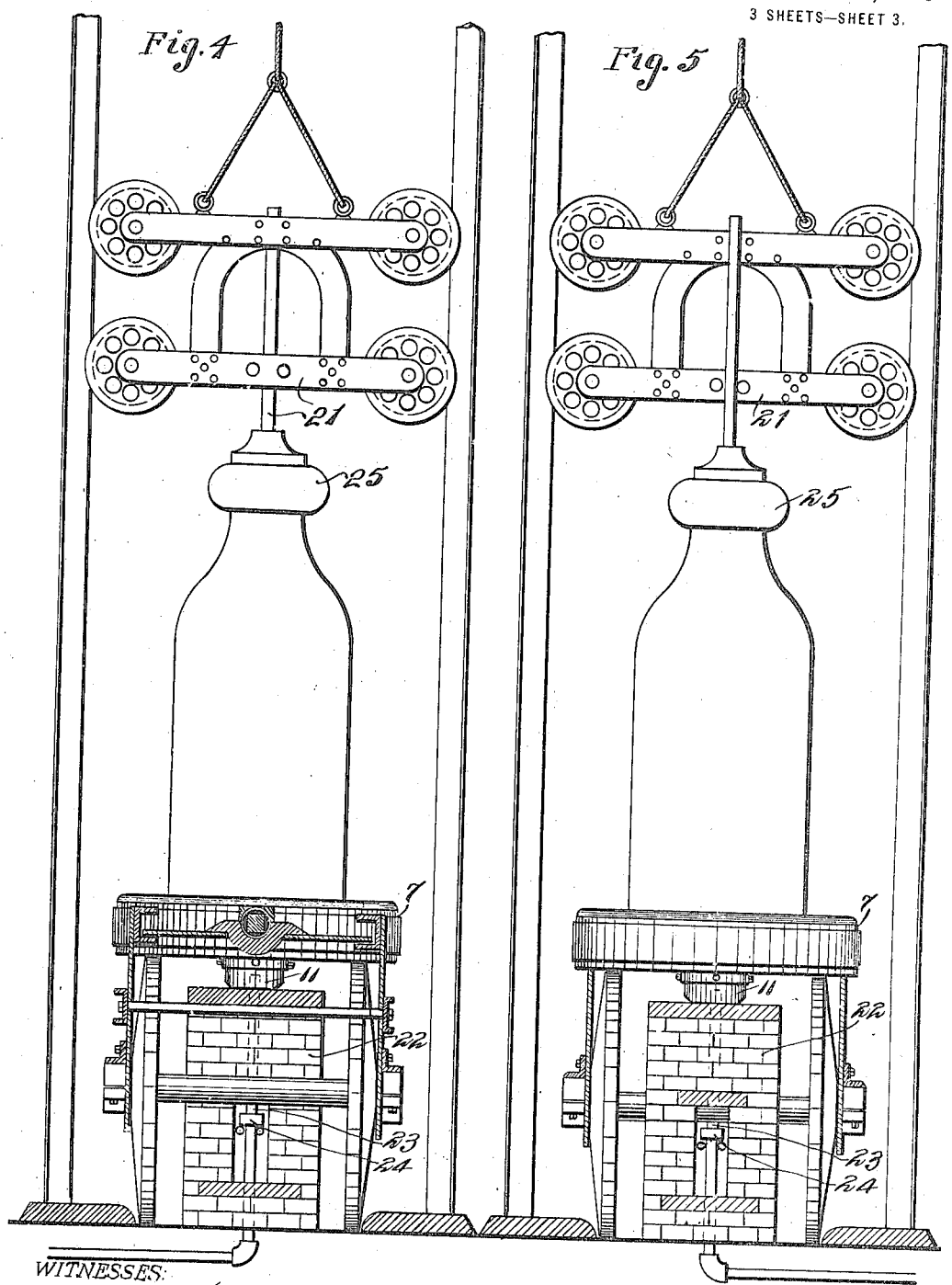

ROGER S. PEASE, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

GLASS-DRAWING APPARATUS.

1,161,246.     Specification of Letters Patent.     Patented Nov. 23, 1915.

Application filed May 7, 1913. Serial No. 766,006.

*To all whom it may concern:*

Be it known that I, ROGER S. PEASE, a citizen of the United States, residing at Pittsburgh, in the county of Allegheny and State of Pennsylvania, have invented certain new and useful Improvements in Glass-Drawing Apparatus, of which the following is a specification.

This invention relates to glass drawing apparatus and has reference to the provision of a novel and improved apparatus for segregating a quantity of molten glass from the body of the glass in the tank or furnace and from which the drawing is afterward done. My invention also contemplates the provision of improved means for removing from the receptacle from which the drawing is done, the glass remaining after the draw; the provision in combination with apparatus of the character described of improved means for supplying fluid pressure for the drawing operation; and in general the provision of simple means for abstracting or segregating a quantity of the purer glass in the tank and drawing it therefrom, and by means of which the operations are accomplished with rapidity and the quality of the product obtained improved. A further object resides in the provision of a segregating and drawing receptacle of the character described which is provided with means for retaining the heat, whereby proper drawing conditions are maintained.

The foregoing together with such other objects as may hereinafter appear or are incident to my invention, I attain by means of a construction illustrated in the accompanying drawings wherein Fig. 1 is a side elevation and partial section of my improved apparatus in charging position; Fig. 2 is a side elevation of the device showing the parts in another position; Fig. 3 is an enlarged sectional view of the apparatus in position for the drawing operation and Figs. 4 and 5 are respectively rear and front elevations of the apparatus.

One of the chief objects of my invention is the provision of simple and efficient means for economically carrying out the drawing of glass cylinders and the like, while at the same time superiority of product is obtained. I accomplish the foregoing by providing a combined segregating and drawing receptacle by means of which a quantity of the molten glass in a tank or furnace can be readily and conveniently gathered in the receptacle, after which the receptacle is moved to one side and drawing of the cylinder therefrom proceeded with.

In carrying out my invention I provide a receptacle 7 which is preferably composed of metal and which is provided with double walls 8 and 9, spaced apart to provide an insulating space 10 filled with air or other substance having non conducting properties. The inner wall 9 of the receptacle is bent up at the central part of the receptacle, providing an annular glass containing cavity from the central portion of which, above the normal level of the glass, is the opening of a spout 11 which extends downwardly beyond the bottom of the receptacle. Within the receptacle is a liner 12, preferably made of sheet metal and having a shape conforming to that of the annular cavity. The liner 12 is provided with a funnel like extension 12′ which fits into the spout 11 and is substantially co-extensive therewith. At the top the receptacle is provided with a rounded or beaded edge 13 which is adapted to engage a grooved cover plate 14, which is also double walled. A pipe 15 leads from the interior of the cover to any suitable type of air pump, or similar apparatus for exhausting the air within the receptacle after the lid or cover is placed in position.

The receptacle is secured to an operating arm 16 mounted on the truck 17 for rotative movement with respect thereto, there being a handle 18 at the end of the arm 16 for turning the latter. A handle 19 is secured to the truck 17 to provide a means for moving the truck about to various operative positions. It will be clear that the angular inclination of the receptacle may be varied so as to introduce the same into the tank 20, as shown in Fig. 1.

Assuming that the parts are in the position indicated in Fig. 1 the operation of the apparatus is as follows: Air is exhausted from the receptacle and glass from the tank flows up through the extension 12′ of the liner 12, the end of said extension and the spout 11 normally lying beneath the level of the glass in the tank so that only the purer portions of glass are drawn from. The glass wells up within the receptacle and flows into the glass containing cavity. When the glass has reached substantially the level shown in Fig. 1, the vacuum is broken and the body of glass remaining in the extension 12′ flows back into the tank after which the device is rolled to one side and brought to rest beneath the drawing apparatus 21, which may be of any preferred type. The spout 11 rests on the pier 22 located beneath the drawing apparatus. The pier is apertured to receive a movable pipe 23 for supporting the air pressure required for the drawing operation. The end of the pipe 23 normally lies below the top of the pier so that the receptacle can be conveniently positioned without tilting, the pipe being elevated by any suitable tool engaging the collar 24. The pipe when raised occupies the position shown in Fig. 3, that is the upper end thereof projects into the extension 12′. The small quantity of glass which adheres to the walls of the extension works downward and seals the joint between the pier and the spout, as appears in Fig. 3. The lid or cover is now removed, the bait 25 is immersed in the glass and the drawing proceeds as usual.

After drawing of the cylinder has been accomplished and the cylinder cut off, the truck is moved to the cullet heap and inverted and the liner falls out together with such portions of glass as remain therein after the draw. If desired the liner and the glass therein may be immersed in water to free the glass from the liner, when it will be ready for reuse, or a new liner may be placed in the receptacle and the operation above described repeated.

It will be seen from the foregoing that the receptacle is in effect a combined segregating and drawing pot, which takes the glass from the tank and from which the drawing is afterward proceeded with. Some of the chief advantages of this construction are greater rapidity in operation and the attainment of superior product, primarily because the handling of the glass by the device is accomplished with the least possible amount of agitation. By providing both the pot itself and the cover therefor with insulating spaces to prevent the rapid radiation of the heat from the glass, the glass is maintained in suitable working condition. It will also be seen that the pot and liner constitute in effect a receptacle having a separable bottom, by means of which all the glass remaining after a draw can be readily removed and another draw made without the delay and the expense incurred, where such portions of glass remain in the main body of glass from which the drawing is done and are reheated before the next draw can be made. The device also effects a considerable saving in labor and expense over the method wherein the drawing is done from a pot and the glass remaining in the pot after a draw is melted out by heat before the next draw can be made. The spout not only provides a means for charging the pot with glass, but also serves to conduct air pressure to the interior of the cylinder being drawn, thereby simplifying the overhead drawing apparatus. The glass seal adjacent the top of the pipe 23 prevents the escape of the air within the cylinder. The arrangement of spout is such that only a negligible quantity of the surface is drawn from the tank into the pot, the surface glass being undesirable for drawing operations owing to the impurities in the glass which, experience has shown, rise to the surface.

What I claim is:

1. In a glass segregating apparatus having a receptacle for receiving a quantity of glass from a body thereof, a conduit for the glass leading from a point within the body of glass and having its discharge opening within the receptacle above the bottom thereof, and means for varying the pressure within the receptacle with respect to pressure outside of the receptacle for forcing the glass through the conduit into the receptacle.

2. In a glass segregating apparatus having a receptacle for receiving a quantity of glass from a body thereof, a conduit for the glass leading from a point within the body of glass and having its discharge opening within the receptacle above the bottom thereof, a removable cover for the receptacle, and means for creating a vacuum within the receptacle whereby glass is forced through the conduit into the receptacle.

3. In a glass segregating apparatus having a receptacle for receiving a quantity of glass from a body thereof, a conduit for the glass leading from a point within the body of glass and having its discharge opening within the receptacle above the bottom thereof, and means for creating a vacuum within the receptacle, whereby glass is forced through the conduit into the receptacle.

4. In a glass segregating apparatus having a receptacle for receiving a quantity of glass from a body thereof, a conduit for the glass leading from a point within the body of glass and having its discharge opening within the receptacle above the bottom thereof, and means whereby the pressure within the receptacle is maintained below the pressure outside the same whereby glass is forced into the receptacle through the conduit.

5. In glass drawing apparatus, a glass containing receptacle having a separable bottom adapted to be removed with the glass normally remaining in the receptacle after a glass making operation.

6. In glass drawing apparatus, a drawing pot having a liner separable from the pot and adapted to contain the glass, the liner being removable with the glass normally remaining after a glass drawing operation.

7. In glass drawing apparatus, an invertible glass containing receptacle having a separable bottom adapted to be removed when the pot is inverted.

8. In glass drawing apparatus, a combined segregating and glass drawing receptacle provided with a conduit through which the glass is drawn into the pot, and a separable liner for the pot adapted to be removed from the pot together with the glass normally remaining after a drawing operation.

9. In glass drawing apparatus, a combined segregating and glass drawing receptacle provided with a conduit through which the glass is drawn into the pot, a separable liner for the pot adapted to be removed from the pot together with the glass normally remaining after a drawing operation, a cover for the receptacle, and means for creating a vacuum therein to draw the glass through the conduit into the receptacle.

In testimony whereof I have hereunto signed my name in the presence of the two subscribed witnesses.

ROGER S. PEASE.

Witnesses:
LETITIA A. MYERS,
ARTHUR SYNNESTVEDT.